United States Patent [19]

Midgley

[11] 3,901,088

[45] Aug. 26, 1975

[54] METHOD OF AN APPARATUS FOR TESTING WHETHER A SOLDER CONNECTION CAN BE MADE THROUGH AN APERTURE IN A CIRCUIT BOARD

[75] Inventor: John Midgley, Pudsey, England

[73] Assignee: Lucas Aerospace Limited, Birmingham, England

[22] Filed: June 13, 1973

[21] Appl. No.: 369,550

[30] Foreign Application Priority Data

June 13, 1972 United Kingdom............... 27536/72

[52] U.S. Cl......................................... 73/432; 73/15

[51] Int. Cl.$^2$........................................... G01N 33/00

[58] Field of Search....... 73/15 R, 150 R, 159, 15.4, 73/432 R; 228/33, 43; 324/51

[56] References Cited

UNITED STATES PATENTS

| | | | |
|---|---|---|---|
| 3,126,854 | 3/1964 | Nabal | 228/33 |
| 3,382,703 | 5/1968 | Babakitis | 73/15 R |
| 3,857,290 | 12/1974 | Aitkin et al. | 73/432 |

OTHER PUBLICATIONS

Oachs, Assessing the Solderability of Round-Wire Terminations after Long Storage, Electronic Eng., Oct. 1970, Vol. 42, No. 512, pp. 84–85.

*Primary Examiner*—S. Clement Swisher
*Attorney, Agent, or Firm*—Holman & Stern

[57] ABSTRACT

A method of testing whether a solder connection can be made within or through an aperture in a circuit board and which comprises the step of timing the interval it takes for solder which is maintained in contact with the lower end of the aperture, to work upwardly within or through the aperture.

2 Claims, 2 Drawing Figures

METHOD OF AN APPARATUS FOR TESTING WHETHER A SOLDER CONNECTION CAN BE MADE THROUGH AN APERTURE IN A CIRCUIT BOARD

This invention relates to a method of and apparatus for testing whether a solder connection can be made within or through an aperture in a circuit board, and has as its object the provision of such a method and such apparatus in a convenient form.

In accordance with one aspect of the present invention there is provided a method of testing whether a solder connection can be made within or through an aperture in a circuit board comprising the step of timing the interval it takes for solder which is maintained in contact with the lower end of the aperture to work its way upwardly within or through the latter.

Preferably, the method also comprises the steps of clamping said board so that the said aperture is vertically aligned with said solder and subsequently lowering said board so that the lower surface of the board contacts said solder prior to measuring said time interval.

In accordance with a further aspect of the present invention there is provided apparatus for testing whether a solder connection can be made within or through an aperture in a circuit board, said apparatus comprising a heating block, a platform disposed above said heating block and movable in a vertical direction, said platform having an aperture which is vertically aligned with said heating block, clamping means for clamping a circuit board to said platform, and alignment means for in use vertically aligning said aperture in the circuit board with solder located on said heating block, the arrangement being such that in use a circuit board can be clamped by said clamping means to platform, verically aligned with solder on said heating platform by said alignment means and subsequently lowered together with said platform until the lower surface of said circuit board contacts said solder.

Preferably, said clamping means comprises at least two pins which are resiliently urged towards the upper surface of said platform in a direction perpendicular thereto.

Desirably, said alignment means comprises a further pin which conveniently is resiliently urged away from the upper surface of said platform in a direction perpendicular thereto.

Figure 1:
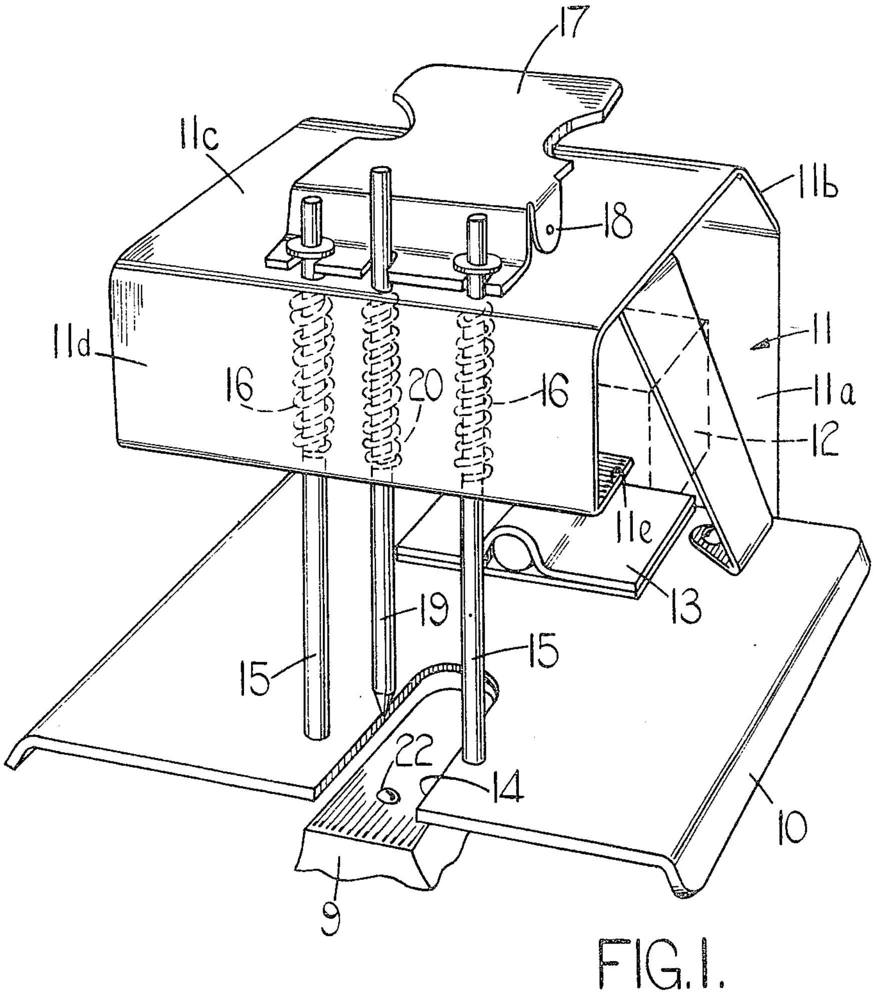
Figure 2:
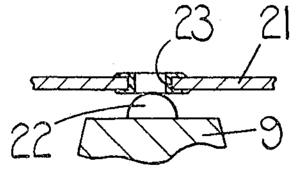

The invention will now be more particularly described with reference to the accompanying drawings in which:

FIG. 1 is a perspective view of one embodiment of apparatus for testing whether a solder connection can be made within or through an aperture in a circuit board and constructed in accordance with the present invention, and FIG. 2 is a sectional view of part of the apparatus of FIG. 1 during testing.

Referring to the drawing, the apparatus shown therein comprises a platform 10 and a support bracket 11 having a first portion **11*a* which extends in a direction perpendicular to the platform 10 with its lower edge secured to the rear of the platform 10, a second portion 11*b* which is inclined to the platform 10 so as to extend towards the front of the platform 10 in an upward direction and which has its lower edge integrally formed with the upper edge of the first portion 11*a*, a third portion 11*c* which extends in a direction parallel to the platform 10 in a direction towards the front edge of the platform 10 and which has its rear most edge integrally formed with the upper edge of the portion 11*b*, and a fourth portion 11*d* which depends from the front edge of the portion 11*c* and which has an integral inturned flange 11*e* at its lowermost edge, the flange 11*e*, the portion 11*d* and the front part of the portion 11*c* defining therebetween a generally C-shaped channel. Secured to the rearmost edge of the first portion 11*a* is a bracket 12 which together with a locating plate 13 secured to the rear surface of the platform 10 enables the platform 10 together with the support 11 to be mounted on a vertical guide (not shown) for vertical slidable movement thereon from a position in which the forward lower surface of the platform 10 is disposed adjacent to a heating block 9 to a position in which the platform 10 is disposed in a position vertically above the heating block 9. The forward edge of the platform 10 has an aperture in the form of an elongated slot 14 extending in a direction towards the rear edge of the platform and this slot 14 is vertically aligned with the heating block 9.**

The apparatus also includes releasable clamping means for clamping a circuit board to the platform 10 and said releasable clamping means comprises a pair of pins 15 which each extend through vertically aligned apertures in the flange **11*e* and the third portion 11*c*, the two pins 15 being arranged so that they are laterally spaced adjacent opposed sides of the slot 14. The pins 15 are resiliently urged towards the upper surface of the platform 10 in a direction perpendicular thereto by compression springs 16, each spring 16 surrounding its associated pin 15 and being trapped between an abutment formed on the pin and the lower surface of the portion 11*c*. Vertically upward movement of the pins 15 can be effected by applying manual pressure to outer end of a lever 17 which is pivoted on the upper surface of the portion 11*c* at 18 and which has its other end secured to the upper ends of the two pins 15.**

Finally, alignment means are provided for use in vertically aligning an aperture in the printed circuit board with solder located on the heating block 9. The aforesaid alignment means comprises a further pin 19 which is disposed between the pins 15 and which extends parallel thereto, the pin 19 having a conical lower end and being resiliently urged away from the upper surface of the platform 10 by a compression spring 20 which surrounds the pin 19 and which is trapped between the upper surface of the flange **11*e* and an abutment on the pin 19. Downward movement of the pin 19 against the influence of the spring 20** can be effected by manual pressure applied to the upper end of the pin.

The aforesaid apparatus can be used to test whether a solder connection can be made within or through an aperture in a circuit board, such as the printed circuit board shown at 21 in FIG. 2, by timing the interval it takes for solder which is maintained in contact with the lower end of the aperture to work its way upwardly through the latter, it being appreciated that the walls of the aperture will always have initially been metal coated either by plating or by the insertion of a hollow metallic cylinder. To this end, molten solder 22 is provided on the upper surface of the heating block 9 at a position directly below the lower end of the pin 19 and the position of the solder 22 can be checked by lowering the pin 19 under manual pressure. The printed circuit board 21 is then clamped by the pins 15 to the platform 10 and an aperture 23 to be tested in the printed circuit board 21 is then aligned with the solder 22 by adjusting the position of the printed circuit board 21 until the conical lower end of the pin 19 can be inserted by applying manual pressure to the pin 19 into the upper end of the aperture 23. The pin 19 is then released and the platform 10 together with the support 11 is moved downwardly along the aforesaid guide until the lower surface of the circuit board 21 just contacts the solder 22 on the heating block 9 which is the position shown in FIG. 2. The time interval is then measured during which it takes the solder 22 to work its way upwardly through the aperture 23 in the printed circuit board 21 and depending upon the time that this takes it is possible to determine whether a satisfactory solder connection can be made between the upper and lower surface of the printed circuit board 21 through the aperture 23. For example, if it takes more than 5 seconds for solder to work its way up the aperture then that printed circuit board may be regarded for practical purposes as being unsolderable.

In some instances a connection may be required to be made between one end of a hole and a position part way along the hole. Such a case may arise where a multi-layer board is to be soldered. The same apparatus can be utilised.

I claim:

1. Apparatus for testing whether a solder connection can be made within or through an aperture in a circuit board, the wall of said aperture being coated with a solderable metal, said apparatus comprising a heating block, a platform disposed above said heating block and movable in a vertical direction, said platform having an aperture which is vertically aligned with said heating block, clamping means for clamping a circuit bound to said platform, said clamping means comprising at least two pins and means resiliently urging said pins towards the upper surface of said platform in a direction perpendicular thereto, and alignment means coacting with the aperture for vertically aligning said aperture in the circuit board with solder located on said heating block, the arrangement being such that in use a circuit board can be clamped by said clamping means to said platform, vertically aligned with solder on said heating block by said alignment means and subsequently lowered together with said platform until the lower surface of said circuit board contacts said solder.

2. Apparatus as claimed in claim 1 wherein said alignment means comprises a further pin and means resiliently urging said further pin away from the upper surface of said platform in a direction perpendicular thereto.

* * * * *